United States Patent [19]

Romano

[11] 4,173,126
[45] Nov. 6, 1979

[54] MACHINE FOR THE CONTINUOUS PRODUCTION OF WHIPPED CREAM

[75] Inventor: Emanuele Romano, Chiasso, Switzerland

[73] Assignee: Wetrifin A.G., Mauren, Italy

[21] Appl. No.: 842,805

[22] Filed: Oct. 17, 1977

[30] Foreign Application Priority Data

Oct. 15, 1976 [IT] Italy .............................. 28401 A/76

[51] Int. Cl.² .................................................. B01F 3/04
[52] U.S. Cl. ......................................... 62/306; 62/377
[58] Field of Search ................. 62/136, 306, 343, 377

[56] References Cited

U.S. PATENT DOCUMENTS

| 1,930,941 | 10/1933 | Modlin | 62/136 |
| 2,354,272 | 7/1944 | Miller | 62/377 X |
| 3,537,273 | 11/1970 | Alvarez | 62/377 |

FOREIGN PATENT DOCUMENTS 720200 10/1965 Canada .................................. 62/306

*Primary Examiner*—John E. Murtagh
*Attorney, Agent, or Firm*—Oblon, Fisher, Spivak, McClelland & Maier

[57] ABSTRACT

A whipped-cream dispensing machine is disclosed, in which the component parts are so arranged as to be easily and conveniently dismembered for cleaning and inspection purposes, whereas the timing and switching assemblies for the machine are located in a less accessible location so as to be less exposed to unauthorized manipulation thereof.

8 Claims, 4 Drawing Figures

MACHINE FOR THE CONTINUOUS PRODUCTION OF WHIPPED CREAM

BACKGROUND OF THE INVENTION

1. Field of the Invention

This invention relates to a machine for the continuous production of whipped cream, the component parts of the machine being arranged in a particularly advantageous manner.

2. Description of the Prior Art

As is well known to those versed in this particular field of technical art, machines of the continuous production of whipped cream comprise a so-called texturizer which is fed with the food mixture wherein the latter, properly emulged by the agency of a gas under pressure, is homogeneized as it is passed through the labyrinth meanders of the texturizer, to be eventually dispensed through a cock member.

The food mixture is held in a tank which is connected, via tubings, to a source of gas under pressure, such as air, and to the texturizer.

The tank which contains the food mixture must, as is obvious, be stored in a properly refrigerated enclosure, and it is for this reason that the component parts of such a machine are contained in a refrigerated cabinet.

SUMMARY OF THE INVENTION

An object of the present invention is to provide a machine for the continuous production of whipped cream, the component parts of the machine being arranged within a refrigerating cabinet in a manner which affords ready accessibility for upkeep, repair and replacement of parts.

Another object of this invention is to provide a machine for the continuous production of whipped cream, the control members of such a machine, while being readily accessible for an operator, cannot, however, be tampered with by unauthorized people.

These objects are achieved, according to the invention, by a machine for the continuous production of whipped cream, such machine being characterized as including a cabinet having in the top section thereof a refrigerating cell adapted to house a tank containing a food mixture, such tank being connected, by pipings, to a texturizer installed on a front door which closes the cabinet and to a mechanism for feeding a gas under pressure, such means being housed in a bottom section of the cell and, a motorized compressor unit for the cell which is positioned in the interior portion of the bottom section.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

In the drawings.

DETAILED DESCRIPTION OF THE PREFERRED EMBODIMENTS

Figure 1:
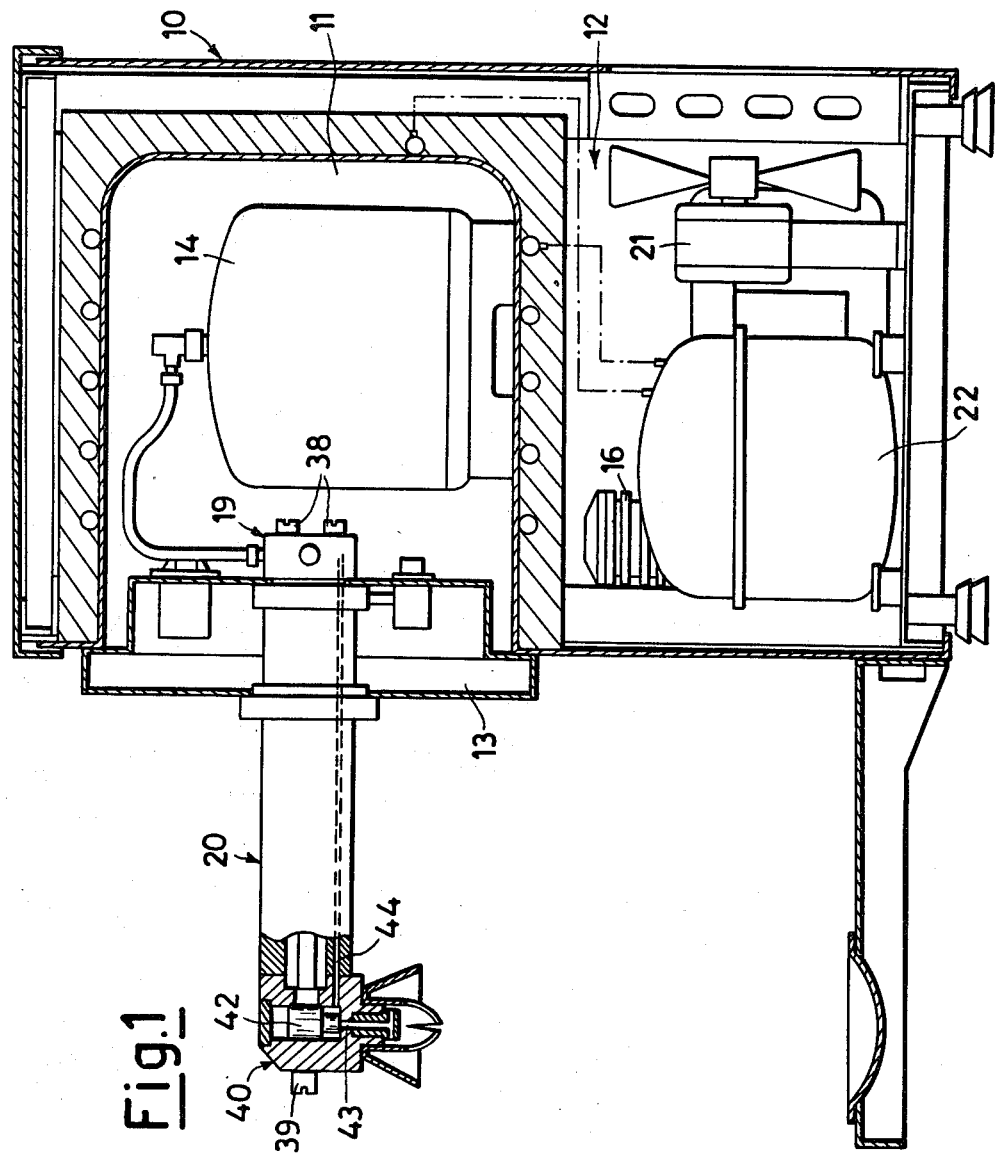
FIG. 1 is a longitudinal cross-sectional view of a preferred embodiment the machine of the present invention.
Figure 2:
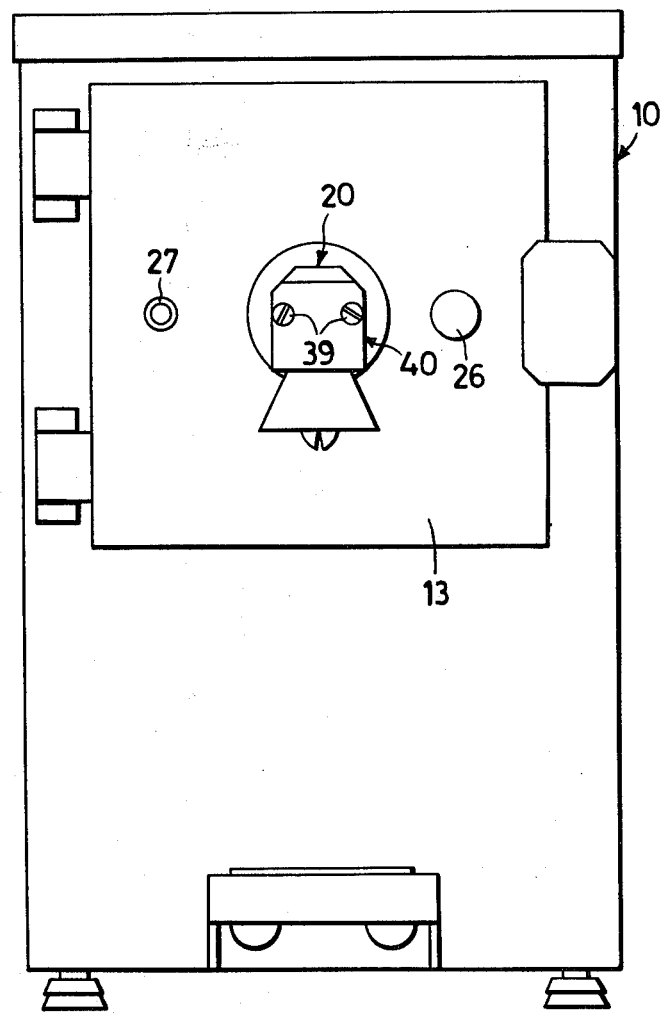
FIG. 2 is a front elevational view of the embodiment shown in FIG. 1.
Figure 3:
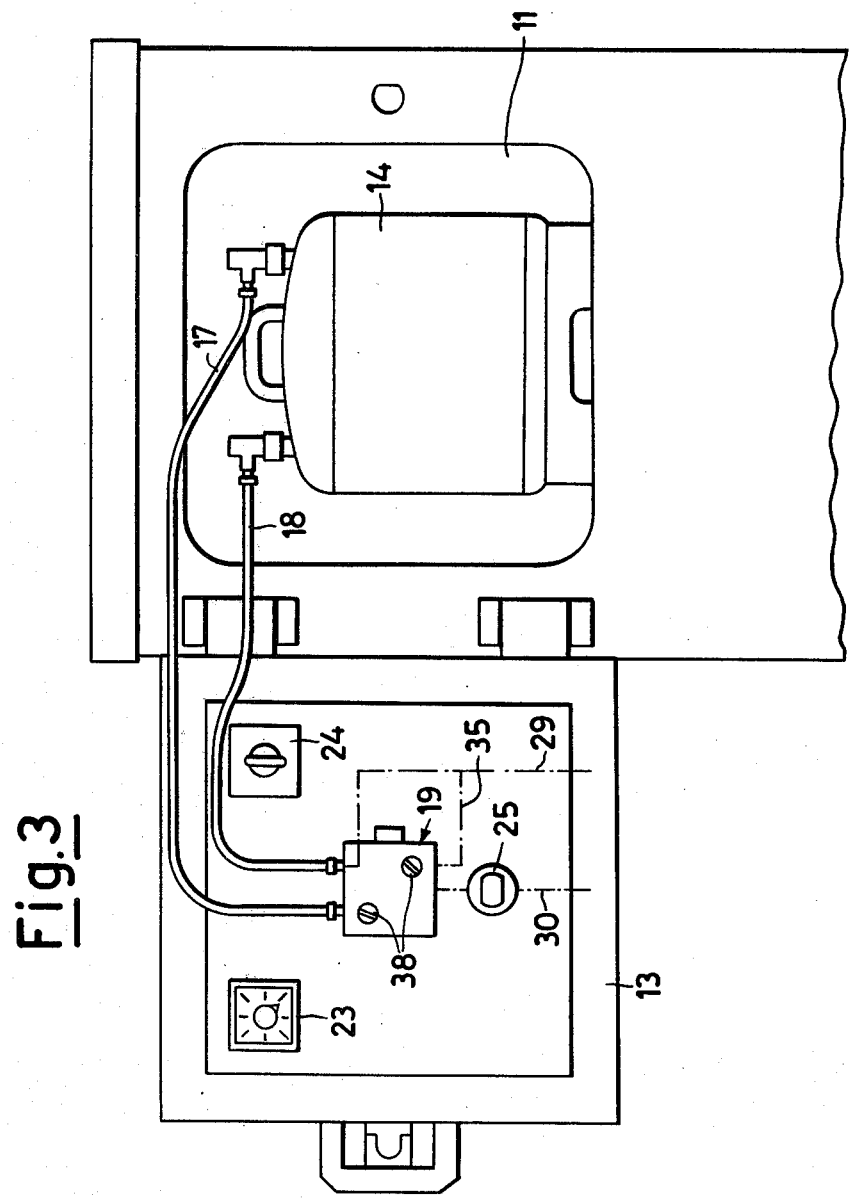
FIG. 3 is a fragmentary view similar to FIG. 2, but showing the machine with the refrigerating cell door open.

With reference to the drawings, the machine is generally indicated by reference numeral 10 and includes a cabinet enclosing a top refrigerating cell 11 and a bottom compartment 12.

The cell 11, the front side of which is closed by a door 13, is intended to receive a tank 14 of the kind which is conventionally used for containing a food mixture adapted to the preparation of whipped cream.

Figure 4:
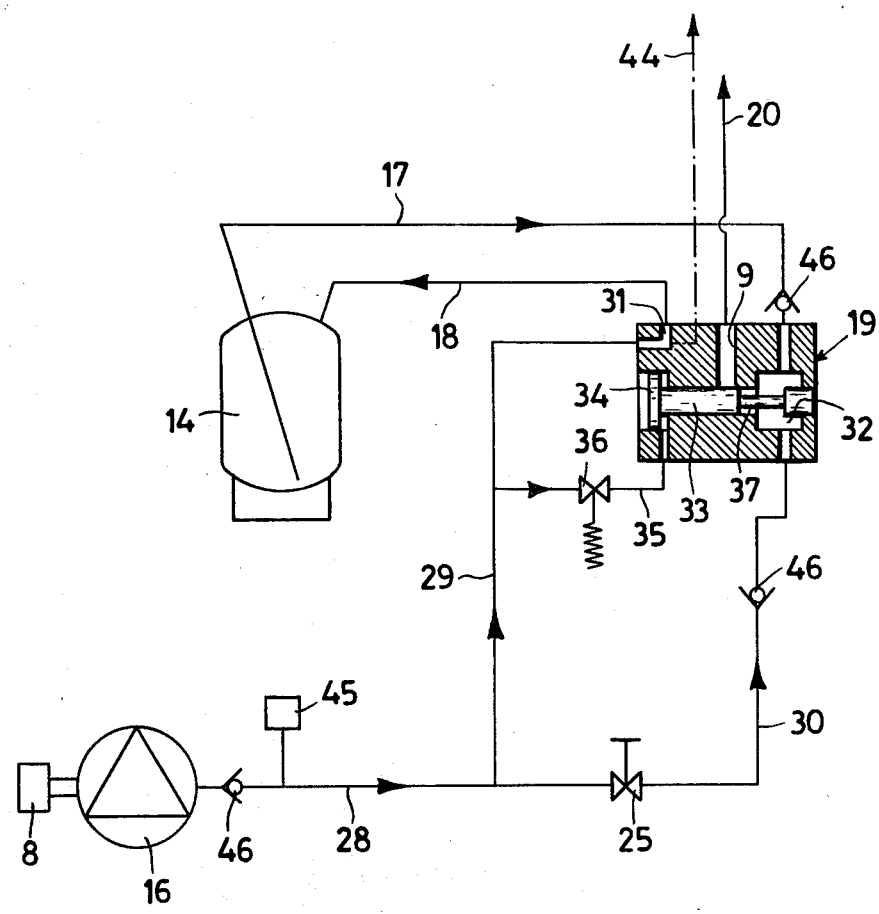
FIG. 4 shows the operational diagram of the machine.

As can clearly be seen in FIG. 4 of the drawings, an air compressor 16 has a delivery side 28 from which two pipings 29 and 30 open and which reach an admixing and dispensing chamber or dispenser 19 of a texturizer 20, the latter being mounted on the door 13.

The piping 29, via a passageway 31, is connected to a piping 18 which opens into the tank 14, whereas the piping 30 opens into an admixing chamber 32 of the dispenser 19. Also in the chamber 32 there opens a piping 17 which is connected to the tank 14 for delivering the food mixture, and within the chamber 32 a slide valve 33 can be reciprocated, which is equipped with a driving piston 34 as actuated by the pressurized fluid drawn from the pipe 29 via a branch-off member 35. The flow of the fluid through the branch-off member 35 is controlled by an electromagnetic valve 36 which is automatically open at the start of every working cycle of the machine.

The slide valve 33 has an annular space 37 which is adapted to establish communication between the admixing chamber 32 and a piping 9, the latter leading to a texturizer 20 mounted on the door 13.

The texturizer in itself can be of any conventional make, but is, quite characteristically, mounted on the door 13 by the agency of the admixing valve 19 with the intermediary of bolts such as 38.

Downstream of the texturizer 20 is affixed, by means of bolts 39, a head 40 which contains a dispensing cock formed by a plunger 42, the latter being urged to a position which opens the duct 43 for emptying the texturizer by compressed air drawn from the duct 30 through a duct 44 which passes through the texturizer 20. Once the working cycle is completed, the delivery of fluid under pressure is discontinued by for example, an appropriate spring members urging the plunger 42 in such a position as to cut off the duct 43, thus preventing the cream from dropping through the dispensing cock.

In FIG. 4, reference numeral 8 indicates the compressor filter, 45 is a pressure-stat which controls the operation of the compressor, and reference numerals 46 are tightness valves.

The compartment 12, in addition, houses a unit composed by a motor 21 and a compressor 22 which are a part of a conventional refrigerating loop for the cell 11. In addition, and quite characteristically, the inner surface of the door 13 carries a timer 23 which adjusts the dispensing time for a unit dosage of cream by driving an electromagnetic valve 24 and a cock 25 for regulating the delivery of the emulgating air. The outer face of the door 13 has, conversely, a control push-button 26 and a pilot lamp 27.

The machine constructed according to the invention allows for ready accessibility to the refrigerating cell 11, the latter being advantageously arranged at a level convenient for an operator. The component parts 23, 24 and 25 are less readily accessible and thus less exposed to being tampered with. The washing of the mixing slide valve and of the texturizer can easily be carried out by inserting, instead of tank 14, a container holding an appropriate detergent therein.

It is worth noting how easy it is to dismember, for cleaning, the mixing valve 19 and the head 40 by merely manipulation of screws 38 and 39. Once the valve 19 and the head 40 have been withdrawn, the texturizer 20 can be easily slipped out of its outer hood for cleaning.

Another advantage is afforded by the fact that, upon completion of each working cycle, the cream which has been left in the texturizer is isolated by the external atmosphere by the agency of the plunger 42, the latter, in addition, permitting the working pressure itself of the machine to be stabilized in the interior of the texturizer. This results in the fact that the cream within the texturizer retains its organoleptic properties in quite unaltered state. In this connection, it is worth noting that the texturizer is refrigerated at about the same temperature as the cell 11 due to conduction through the slide valve 33.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A machine for the continuous production of whipped cream during a given time period, comprising:
   a cabinet a refrigerating cell disposed in a top portion of said cabinet and including a bottom compartment
   a tank containing a food mixture disposed in said cell
   a door mounted on said cabinet so as to close said cell
   a texturizer mounted on said door
   piping members interconnecting said tank and said texturizer
   means for feeding a gas under pressure disposed in said bottom compartment of said cell, and
   a motor and compressor unit disposed in said bottom compartment forming a refrigerating loop of said cell.

2. A machine according to claim 1, further comprising dispensing chamber means including an admixing chamber and dispensing slide valve wherein said means for feeding said gas under pressure is connected to siad tank and to said admixing chamber, said gas under pressure delivering a food mixture to said chamber.

3. A machine according to claim 1, wherein said means for feeding gas under pressure comprises an air compressor.

4. A machine according to claim 1, further comprising means for controlling and regulating said machine mounted on an inner surface of said door.

5. A machine according to claim 2, wherein said slide valve is mounted on an inner surface of said door and in a heat-transfer relationship with said texturizer.

6. A machine according to claim 1, wherein said texturizer includes, in a downstream section thereof, a dispensing cock controlled by said means for feeding gas under pressure.

7. A machine according to claim 6, further comprising a head and a cock wherein said cock is housed within said head, said head being removably positioned at the downstream end of the texturizer.

8. A machine according to claim 5, wherein said slide valve is removably mounted at the upstream end of said texturizer.

* * * * *

UNITED STATES PATENT AND TRADEMARK OFFICE
CERTIFICATE OF CORRECTION

PATENT NO. : 4,173,126
DATED : November 6, 1979
INVENTOR(S) : Emanuele Romano

It is certified that error appears in the above-identified patent and that said Letters Patent are hereby corrected as shown below:

---[73] Assignee: Wetrifin A.G., Mauren, Liechtenstein---

Signed and Sealed this

Twenty-second Day of July 1980

[SEAL]

Attest:

SIDNEY A. DIAMOND

Attesting Officer

Commissioner of Patents and Trademarks